Patented July 24, 1951

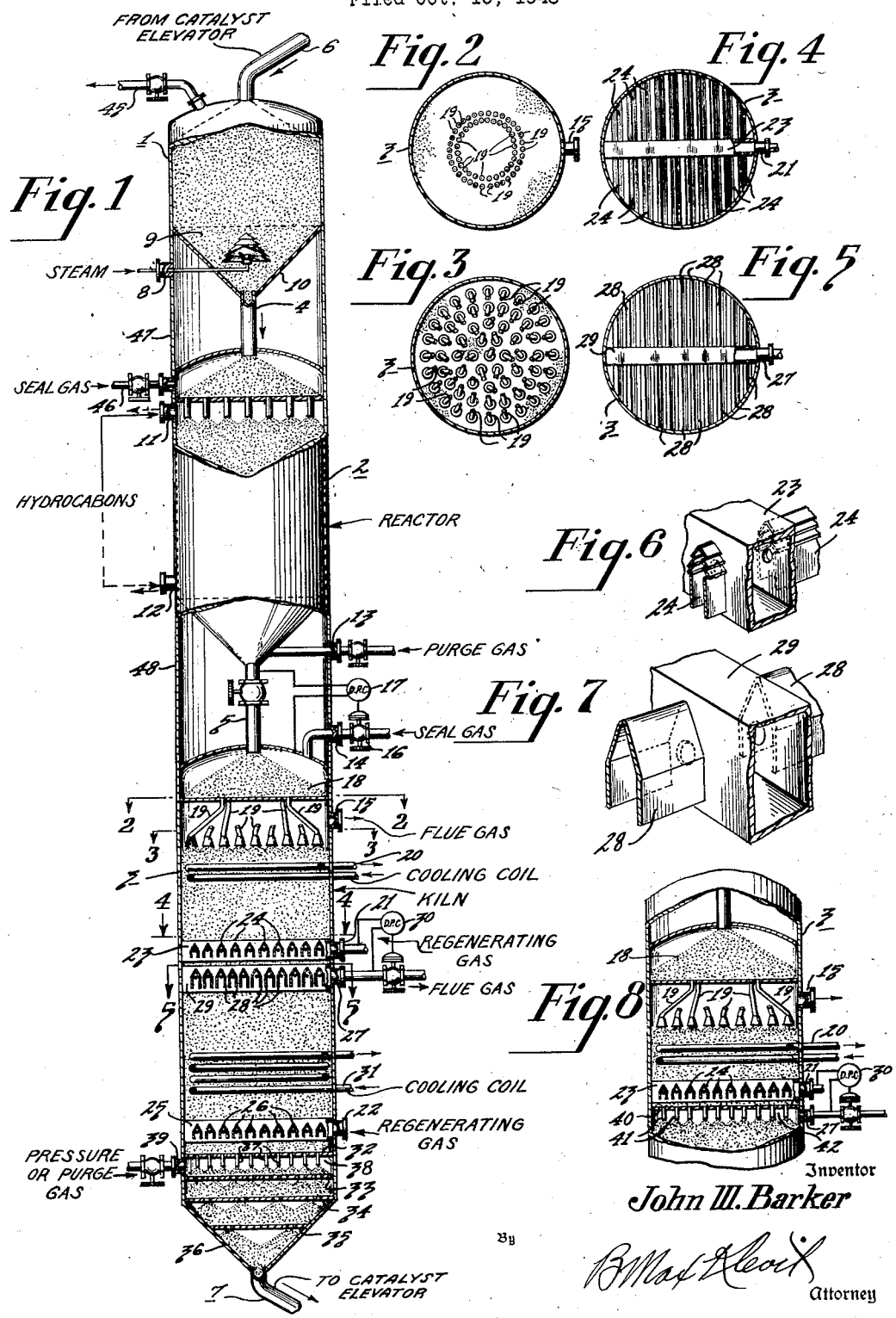

2,561,331

UNITED STATES PATENT OFFICE 2,561,331

CATALYST REGENERATION

John W. Barker, Silver Spring, Md., assignor to Houdry Process Corporation, Wilmington, Del., a corporation of Delaware Application October 15, 1948, Serial No. 54,621

3 Claims. (Cl. 252—418)

The present invention is directed to improvements in methods and systems for reactivation and regeneration of solid contact masses containing combustible deposit therein. It is particularly concerned with the construction and operation of regeneration kilns of the type wherein a moving body of contact mass containing carbonaceous deposit, such as used catalyst from a hydrocarbon conversion step, is brought into contact with an oxidizing or combustion-supporting gas to effect burning of such deposit.

Processes for catalytic cracking of hydrocarbon oils are well known and in extensive commercial use. In typical processes, a hydrocarbon fraction, such as a gas oil, is brought into contact in vapor form and at temperatures of about 800° F. or above with a particle form solid contact mass having catalytic activity, thereby effecting conversion of a substantial part of the hydrocarbons to gasoline. In common use as catalysts for the purpose are natural and synthetic siliceous adsorptive masses, such as chiefly acid-activated clays and dried gels comprising silica and alumina. Similar systems and arrangements are often used in the treatment of gasoline and naphtha fractions to obtain improvements in the quality thereof such as upgrading of the octane rating; these treatments are commonly referred to as "catalytic treating" or "reforming."

A widely used system for carrying out such reactions involves an arrangement wherein the particle form solid contact mass is moved cyclically through two separate vessels in the first of which the desired hydrocarbon conversion reactions are carried out, and in the other vessel the used contact mass from such reactions is regenerated by contact with air or other oxygen-containing gas effecting burning of the combustible deposit called "coke" formed in such mass during the hydrocarbon conversion reactions. The regenerated contact mass is then returned to the first vessel for further use therein.

The regeneration of a catalytic contact mass by burning of the combustible carbonaceous and/or hydrocarbonaceous deposit therein involves exothermic reactions which raise the temperature of the mass. The minimum temperature at which initial combustion of the deposit will take place is at about 750-800° F. and with continued burning the amount of heat liberated causes increase in the temperature of the mass such that, unless suitable controls are provided, temperatures are reached which may result in permanent injury to the mass. For instance, it has been observed that active clay cracking catalysts may be impaired when regeneration temperatures are permitted to exceed about 1150° F. or so, for any appreciable length of time in the presence of quantities of steam adsorbed in the catalyst prior to regeneration as well as that released from burning of the hydrocarbonaceous deposit thereon; synthetic catalysts ordinarily can withstand higher temperatures. To avoid excessive and injurious temperatures provision is made for removal of heat from the regeneration kiln. In typical commercial installations such heat removal is brought about by the provision of vertically spaced cooling sections in the form of coils circulating a heat transfer medium for indirect heat exchange at different selected levels in the kiln.

The present invention has among its objects to provide a simplified kiln construction and operation wherein efficient regeneration of catalyst is obtained with important savings in operation and maintenance costs, in addition to notable economies in equipment construction costs.

In accordance with the present invention, regeneration of catalyst containing coke from a previous hydrocarbon conversion operation is effected by passing the contaminated catalyst, as a compact downwardly moving bed, through a kiln providing several contiguous zones in which the catalyst is subjected to contact with countercurrently flowing regenerating gas, such as air or other oxygen-containing gas, to effect combustion of the coke. The regenerating gas is separately admitted at the bottom of each of such zones and the flue gas resulting from combustion of the coke is separately discharged at the top of each zone. Admission of gases from one regenerating zone to the other is inhibited by maintaining the outlet pressure of the flue gas from one zone substantially equal to the inlet pressure of the regenerating gas in the zone directly above.

By operating the kiln in the above described manner the pressure drops of the gases passing upwardly through the several zones in the kiln are rendered additive. The total pressure drop of the gases flowing through the kiln thus can be advantageously utilized in accordance with the invention to help balance the pressures employed in the remainder of the system and thereby reduce the seal leg requirements in the system. In hydrocarbon conversion systems wherein the reactor and kiln are located one above the other, such reduction of seal leg requirements is particularly important from the standpoint of decreasing the over-all height of the system.

The entire regeneration is carried out as a stage operation but under controlled conditions such that only counter-current flow between the regenerating gas and the descending catalyst is utilized in each stage. By this arrangement there is obtained as one important advantage a low concentration of oxygen in the vicinity of high coke content on the catalyst and a maximum oxygen concentration in the vicinity of the lowest coke content, thereby permitting unhindered burning of coke under conditions prevailing in the several zones of the kiln without causing overheating of the catalyst. Thus also, the gas of highest oxygen concentration is initially brought into contact with partially regenerated catalyst containing the last vestiges of coke, which coke is the most difficult to burn, and under conditions of high pressure favoring burning of such coke. Partially spent regenerating gas is provided in the appropriate zone and is utilized in the initial combustion stages, before the regeneration has progressed to maximum operating temperature, to contact catalyst having its full complement of coke. Accordingly the control of temperature along the length of the kiln tends to be self regulating to meet the different requirements while the development of excessive temperatures is inhibited.

In accordance with a preferred embodiment, the regenerating gas introduced directly into the several zones of the kiln is cool air; conveniently at substantially the temperature reached by compression of atmospheric air, which cool air serves efficiently to remove sensible heat from the catalyst by direct thermal exchange, thereby providing further safeguards against detrimental temperatures while operating close to maximum desired temperature and further reducing the overall cooling coil requirements. The space which would otherwise be required for additional cooling equipment can be thus utilized to provide increased useful volumetric capacity of the kiln, if desired, or the overall size can be reduced for any given coke-burning capacity.

Other advantages of the improved kiln design and operation of the invention will be apparent from the description which follows read in connection with the accompanying drawings illustrating one form of apparatus adapted to practice of the invention.

In the drawings, Figure 1 is a largely diagrammatic vertical elevation (portions being broken away and shown in cross-section) of one form of assembled unit embodying the novel kiln design; Figures 2 to 5 are horizontal cross-section views taken respectively on lines 2—2, 3—3, 4—4 and 5—5 of Figure 1; Figure 6 is an enlarged view in perspective, illustrating the relation between a gas supply manifold and connecting distributing channels; Figure 7 is a similar view of a gas discharge manifold and collecting channels; Figure 8 is a partial vertical cross-section illustrating a modified gas discharge arrangement.

Referring now more particularly to Figure 1, there is shown an assembly in superimposed relation of a catalyst supply hopper 1, a hydrocarbon conversion reactor 2 and a kiln 3, with inter-connecting conduits 4 and 5 through which the catalyst is passed respectively from the hopper to the reactor and from the reactor to the kiln. Catalyst is admitted to the hopper 1 by means of conduit 6 and discharged from the bottom of the kiln 3 by means of the conduit 7. The regenerated catalyst discharged from the bottom of the kiln through the conduit 7 is returned by suitable means to the conduit 6 for supply to the hopper 1. Such means may comprise the well known bucket type of mechanical elevator (not shown), for instance the type illustrated in the Simpson et al. Patent U. S. 2,336,041 of December 7, 1943. Instead of a mechanical elevator, a pneumatic type lift may be substituted for elevation of the catalyst.

In the catalyst supply hopper 1, provision may be made for the admission of steam into contact with the catalyst, as by means of a supply line 8 and louvered distributing member 9. The distributing member 9 as shown is located in a portion of the hopper which is of reduced cross-section, being adjacent the downwardly converging wall 10 of the hopper, and as result thereof efficient distribution of the steam into contact with all portions of the catalyst is obtained.

Within the reactor 2, the catalyst is contacted with hydocarbons to be reacted and the gaseous reaction products are discharged from the reactor. The hydrocarbons may be charged to the reactor so as to flow concurrently with the descending catalyst or counter-currently thereto. In a concurrent operation, for instance, the hydrocarbons are admitted through a supply line connecting with the duct 11 and the gaseous effluent discharged through a line connecting with the duct 12. In the reverse operation, the supply line will be connected with the duct 12 and the discharge line with the duct 11. Suitable provision is made in either case for disengaging of vapors from the catalyst.

Communicating with the interior of the lower portion of the reactor 2 and below the level of the duct 12, a line 13 is provided for the admission of purge gas, such as steam, to free the catalyst being discharged from the reactor from condensed liquid oil and polymer. If the reactor is operated concurrently the purge gas admitted through line 13 is discharged together with hydrocarbon conversion products through the duct 12. In the reverse operation, if desired, all or part of the purge gas may be permitted to pass upwardly through the descending catalyst bed for discharge through the duct 11 with the formed hydrocarbon conversion products.

At the top of the kiln 3, means are provided for the admission of seal gas, as through line 14. In the preferred operation a portion of the seal gas will be permitted to flow upwardly through the conduit 5, the remainder flowing downwardly being discharged with flue gases through the duct 15. Admission of seal gas through line 14 is controlled by valve 16, operated automatically by a differential pressure control means 17, which is set to maintain the desired differential pressure between the bottom of the reactor and the top of the kiln. Undesired and dangerous admixture of gaseous products between the reactor and kiln is thus prevented.

The design and operation of the kiln proper will now be described. The catalyst admitted through the conduit 5 is discharged into the kiln onto a tube sheet 18, having distributing downcomers 19 suitably arranged therebelow to distribute the catalyst uniformly over the entire cross-section of the kiln. Below the discharge outlets of the downcomers 19, cooling coils 20 are provided through which a heat exchange fluid is circulated in known manner. The extent of cooling surface to be provided, of course, will depend upon the temperatures designed to be maintained and the thermal balances involved in the operation. Regenerating gas is admitted to the kiln at least at several levels; two of which are shown. Thus, regenerating gas may be admitted at an intermediate level of the kiln through the duct 21 and at a lower level of the kiln through the duct 22, these ducts being connected to suitable supply lines. The ducts 21 and 22 may be interconnected by a manifold provided with proportioning devices or separate supply lines may be used, particularly if regenerating gas at different temperatures is to be employed at the several gas inlets. Discharge of flue gases formed during regeneration in the zone above the inlet duct 21 is had by means of the duct 15 communicating with a plenum space provided above the level of the catalyst bed, wherein separation of gas from the catalyst is easily effected. The duct 15 is in turn connected to a flue gas discharge line (not shown).

The distribution of the incoming regenerating gases admitted through ducts 21 and 22 is effected similarly in both instances. As shown, the duct 21 communicates with a distributing manifold 23, which manifold in turn communicates with a series of open bottomed channel members 24, distributing the admitted gas uniformly over the entire cross-sectional area of the kiln. The duct 22 in similar manner is connected to a distributing manifold 25 and communicating channel members 26. Details of the construction of the gas distributing manifolds and associated channel members are more fully shown in Figures 4 and 6.

The gas admitted through duct 22 and distributing manifold 25 passes upwardly through the kiln and is discharged below the level of manifold 23, by means of a duct 27 and communicating flue gas discharge line. The formed flue gas is collected by open bottomed channel members 28, communicating with the discharge manifold 29, which in turn is connected to the duct 27. (See particularly Figure 7.) To maintain separate control of the upper and lower regenerating zones, admission of flue gas from the regeneration zone below to a succeeding zone above is substantially prevented. This is accomplished by maintaining substantially zero pressure drop between the inlet duct 21 and the discharge duct 27, by suitable automatic differential-pressure responsive flow control means. In the present instance, there is shown a differential pressure controller 30 with appropriate connections, which arrangement can be set for a zero pressure drop across the points indicated; or if desired, the pressure at inlet duct 21 may be slightly above that at discharge duct 27.

Intermediate the inlet duct 22 and the bottom discharge outlet duct 27, additional cooling means are shown at 31. One or more banks of such cooling coils may be provided in this lower portion of the kiln as required by the conditions of the operation.

To secure uniformity of catalyst flow in the kiln, the discharge of catalyst across the area of the kiln is equalized by a tube sheet 32 and a series of perforated distributing plates such as 33, 34 and 35, the bottom of the kiln being made conical as indicated at 36, converging into the conduit 7. The tube sheet 32 is provided with downcomers 37 uniformly spaced over the area thereof and providing an ample plenum space below the tube sheet. For certain operations it may be desirable to admit gas for pressure or purge into the lower portion of the kiln. Accordingly, a valve controlled gas inlet is provided at 39 communicating with the plenum space formed below the tube sheet 32.

In Figure 6, a modified arrangement for separation of flue gas from catalyst is shown, which may be substituted for the channel members 28 and manifold 29. Thus, a tube sheet 40 may be used, provided with uniformly spaced downcomers 41, providing a plenum space as indicated at 42, communicating with the discharge duct 27 and operating in similar manner to the space above the catalyst bed communicating with the duct 15.

It will be understood that in practical operation of a system of the type described, automatic control means will be provided to regulate and maintain desired pressures, and control flow of catalyst and gases in various parts of the system. These control means being generally well understood in the art, for the purpose of simplicity, the instrumentation is not shown in the drawings except in a few instances. The valve controlled line 45 at the top of the hopper 1 serves to maintain a set pressure in the hopper while removing any seal gas and unadsorbed steam above the catalyst bed in the hopper. A valve-controlled line 46 is also provided at the top of the reactor, which can be used, depending upon conditions of operation, for admission of seal gas such as steam or inert gas, or in other types of operation for discharge of gases, such as a portion of the steam which may be permitted to enter the top of the reactor through conduit 4.

The type of arrangement illustrated in Figure 1, is a design particularly adapted to be "shop pre-fabricated" for small capacity installations, such as those circulating up to about 350 tons of catalyst per hour. With this form of "packaged unit," when constructed of suitable diameter (as up to about 12 feet) and in sections of appropriate lengths (as up to no more than about 60 to 70 feet per section), the individual fabricated sections can be shipped to an erection site in railway flat cars. Assembling of the unit then requires only simple operations at the site, such as joining of the sections and attachment of conveyors and piping, with consequent savings in construction costs. For added rigidity of construction, reinforcing shells may be provided, as shown at 47 and 48 (Figure 1) between the several sections of the unit.

The described kiln of the invention and its operation are not limited to use with arrangements of systems as shown in Figure 1; the same type of improved kiln may be employed in other arrangements, such as in systems wherein the kiln is located above the reactor, or the kiln and reactor are located side by side.

The improved kiln design provides wide flexibility of operation from the standpoints of desired pressure balance and thermal balance. In all instances, however, because of the pressure drops through the kiln being additive, the total pressure drop obtained in the kiln can be employed to reduce the seal pressure requirements of the system. In this manner, for instance, the pressure drop through the kiln can be used to break down the existing pressure at the top of the reactor supply hopper and/or at the top of the reactor. If the system is arranged with the reactor and kiln in superimposed relation, the described kiln can be operated under conditions to maintain a comparatively high pressure at the discharge of the lowermost vessel (be it reactor or kiln), which high pressure has particular advantages for use in combination with a pneumatic lift type of elevator. On the other hand, high pressure at the discharge outlet of the bottom vessel is not ordinarily desired with a mechanical elevator, and accordingly in this combination it may be more desirable to operate the system with the lowest pressure that can be expediently had at the discharge outlet of the bottom vessel. Advantageously, with the arrangement shown in Figure 1, if operated with a bucket type elevator, it is preferred to enclose the elevator in a pressure sealed housing, so that the pressure existing at the outlet of the kiln can be substantially maintained at the discharge of the elevator to the inlet of the supply hopper 1.

The following is an example of distribution of gas pressures in practical operation of an arrangement as illustrated in Figure 1, wherein advantage is taken of the pressure drop in the kiln to reduce the total seal leg requirements in the conduits 4, 5, 6 and 7. The pressure at the bottom of the elevator and the top of the reactor supply hopper 1 may be set at about 6 pounds per square inch gauge, which pressure can be maintained during transportation of the catalyst in the elevator by admission of an inert gas into the elevator housing. Introduction of steam through line 8 need be at only a slightly higher pressure to overcome the slight drop through the hopper. In a concurrent operation, the hydrocarbon charge may be introduced through duct 11 at say 8 pounds per square inch gauge, and the vaporous conversion products discharged through duct 12 at say 6 pounds. The conduit 4, to operate as a seal leg would therefore have to be of sufficient length to provide a pressure drop of about 2 pounds. The seal is maintained by introducing a seal gas, which may be steam, through line 46, at a pressure slightly above 6 pounds. A portion of the seal gas will flow up the leg 4, the remainder being permitted to enter the reactor.

Steam or inert gas may be admitted through line 13 for purging the spent catalyst at slightly above the 6 pound pressure at discharge duct 12, say at 6.4 pounds; a portion of the steam or inert gas will be discharged with the hydrocarbons through the duct 12.

The kiln may be operated under conditions such that the total pressure drop through the kiln is about 2 pounds. This drop is had, for instance, by admitting regenerating gas through duct 22 at 4 pounds, withdrawing flue gas through duct 27 at say 3 pounds, admitting regenerating gas through duct 21 at the same 3 pounds and withdrawing flue gas through duct 15 at 2 pounds. The 4 pound differential pressure between the level of line 13 and the top flue gas outlet 15, will then be taken up in the seal leg provided by conduit 5. The difference in pressure between the foot of the elevator and the discharge outlet of the kiln can be made up by admission of pressuring gas into the conduit 7, for instance by admission of flue gas, steam or inert gas through duct 39. It will be understood that to maintain the required pressure seal, conduit 7 may be provided with suitable controls, such as a chopper valve, approximate its outlet to the elevator.

In an alternative arrangement with the kiln located above the reactor the advantages of the present kiln design from the standpoint of reduced overall seal leg requirements will in most instances be even more pronounced.

In certain arrangements, such as where the kiln is supplied with catalyst directly from an elevator, it is preferred to discharge the flue gas from the top of the kiln at about atmospheric pressure. In this way, the elevator bringing catalyst to the top of the kiln need not be sealed against the outside atmosphere.

The following example is typical of a catalytic cracking operation carried out in a system designed to circulate about 675 tons of catalyst an hour, in which 10,000 pounds of coke are to be burned, per hour and employing about 26,000 standard cubic feet of air a minute admitted through ducts 21 and 22. The air may be admitted at compression temperature of say about 100° F. Flue gas may be discharged through the duct 15 at atmospheric pressure or any desired pressure thereabove, taking into account the pressure existing at the discharge of the reactor 2.

Catalyst may be admitted to the kiln at say 925° F. and will be cooled some 15 to 25°, in passing over the top cooling section 20. On descent of the catalyst through the kiln and contact with the air or other regenerating gas admitted through duct 21, the temperature of the catalyst is progressively increased and will reach as a result of coke combustion about 1050° to 1075° F., above the level of the manifold 23 and its connecting channels. In contacting fresh cooler air in that vicinity, the catalyst will be cooled down by efficient direct heat exchange therewith to about 1025° F. Descending further below the flue gas manifold 29, the catalyst will again be raised in temperature by combustion of coke in the presence of the air admitted through duct 22, and will reach a maximum regeneration temperature directly above the lower cooling coils 27, of about 1150° F. In passing over the cooling coils 27 catalyst will be cooled some 25–50°, and below the cooling coil will again be raised in temperature ultimately being cooled by direct contact with the cold air entering through duct 22 to approximately its desired discharge temperature of about 1100 or 1110° F. The extent of cooling by the coils 27 may be adjusted to give the desired catalyst discharge temperature. The pressure drop of the air in passing through the several zones of the kiln will be about 5 pounds. Thus, if it is desired to withdraw the flue gas at the upper discharge outlet 15 at substantially atmospheric pressure, the incoming air admitted through duct 22 may be set at 5 pounds gauge, and the drop distributed along the several zones of the kiln. Thus, the flue gas can be withdrawn through duct 26 at 1½ pounds gauge and to maintain a zero pressure drop between the flue gas outlet 26 and the upper air inlet 21, the regenerating gas will be admitted through duct 21 at substantially the same pressure, 1½ pounds gauge. The pressure drop through the bed above the manifold 23 and cooling coils 20 can then be about 1½ pounds to bring the top of the kiln to atmospheric pressure.

The described kiln operation obtains additional important advantages when the coke content of the catalyst as discharged from the reactor is kept low. This condition obtains, for instance, in carrying out the hydrocarbon conversion operation using high ratios of catalyst to oil charged. For example, in charging of a given heavy gas oil to a catalytic cracking operation at a fixed space rate and selected operating variables such as temperature and pressure, a certain quantity of coke will be produced in the operation per unit time. By keeping the other factors of the operations constant but increasing the mass rate at which catalyst is passed through the reactor, that quantity of coke will be distributed over a greater quantity of catalyst and the percent of coke per unit weight of catalyst is thereby decreased. With usual charge stocks, cracking conditions giving desirable distribution of cracked products can be maintained at catalyst-to-oil ratios in excess of five and up to ten or more with consequent deposition of less than 1% by weight of coke on the catalyst, say approximately 0.4 to 0.8 by weight. In the regeneration of the catalyst of this low coke content, employing the described improved kiln operation, it will be seen, less cooling of the catalyst during the course of regeneration is required to keep within safe maximum temperatures. Also, in maintaining the desired thermal balance, a lesser quantity of heat needs to be removed to provide regenerated catalyst at desired temperature for reuse in the reactor. The novel kiln design and operation of the invention is flexibly adapted for beneficial use with the described hydrocarbon conversion operations wherein catalyst of low coke content is presented for regeneration.

In adapting the operation of the kiln to particular hydrocarbon conversion operations, the ultimate discharge temperature of the catalyst and the degree of cooling of the catalyst in a kiln of fixed dimension and design may be controlled over a wide range by the temperature and/or rate of admission of the regenerating gas, by the temperature at which the indirect heat exchange fluid circulated through the cooling coils is maintained, which may permit blanking out one or more of the cooling coils provided. For instance, with less coke to be burned per weight of catalyst, the upper cooling coil may in some instances be disconnected; or, if desired, regenerating gas at higher temperature as up to prevailing regenerating temperature may be admitted through the inlet 21. In the lower section of the kiln, likewise the flexibility of the operation is extended by similar controls provided in the selection of regenerating gas temperature and indirect cooling surface provided by the coil 27.

The following example is typical of a complete cracking and regenerating operation employing a system of the type illustrated in Figure 1. Acid-activated clay catalyst is employed for cracking of a reduced East Texas crude oil of about 25° API gravity at an average temperature of about 900° F., employing a catalyst-to-oil weight ratio of 5 and a volumetric space rate (measured as liquid) of 5, giving about .7% to 1.0% by weight of coke deposited on the catalyst. In a system circulating 500 tons of catalyst per hour, and some 7000 pounds of coke are to be burned during regeneration, approximately some 25,000 standard cubic feet of air per minute will be employed.

If the catalyst is brought into the reactor at about 1050° F. and the oil charged at say 700° F., (employing concurrent flow) the catalyst discharge temperature may be at about 900° F. By admitting air as regenerating gas at about 100° F. (the temperature of compression of atmospheric air) and appropriately distributing the air between the several inlets, the maximum temperature of combustion will be reached just above the lower cooling coils 27, at say about 1150° F. The catalyst is ultimately discharged from the kiln at about 1000° F. and is brought to reactor inlet temperature of 1050° F. by hydration with steam.

The regenerating gas admitted through the several inlets to the kiln, such as ducts 21 and 22, may be supplied from a common manifold communicating with a blower or gas compressor, reduction valves being employed to obtain the desired different pressures at the several gas inlets. The described arrangement, however, permits the use of separate blowers or compressors connected with each gas inlet, thereby affording further economies in operation by taking advantage of the lower pressure requirements at the intermediate inlet levels.

Obviously many modifications and variations of the invention as hereinbefore set forth may be made without departing from the spirit and scope thereof and therefore only such limitations should be imposed as are indicated in the appended claims.

I claim as my invention:

1. The process of regenerating catalyst containing carbonaceous deposit resulting from use of the catalyst in a hydrocarbon conversion operation, which process comprises burning of said carbonaceous deposit in a plurality of separately controllable combustion stages, wherein the catalyst during regeneration is passed through each of said stages as a compact downwardly moving bed and wholly in counter-current contact with upwardly flowing oxygen-containing regenerating gas separately introduced under pressure in each of said combustion stages, discharging the gaseous products of combustion thereby formed in each combustion stage separately and substantially entirely from that stage and at a pressure substantially equal to the inlet pressure of the regenerating gas introduced into a preceding combustion stage immediately thereabove, thereby avoiding direct admission of material quantities of combustion products formed in one of said combustion stages to another of said stages, the downwardly moving bed of catalyst in passing through successive combustion stages being subjected to increased gas pressure in each succeeding combustion stage.

2. The process of regenerating catalyst containing carbonaceous deposit by contact with oxygen-containing gas, which comprises passing the catalyst in hot state downwardly as a compact bed through a plurality of combustion zones, contacting the catalyst in each of said zones with counter-currently flowing oxygen-containing gas separately introduced into each of said zones from an external source, withdrawing formed gaseous combustion products separately from each of said combustion zones, and so controlling the gas pressures at the regions of introduction and withdrawal of said respective gases into and from said catalyst bed that downward flow of gases through said catalyst bed is opposed, whereby the pressure drops due to the flow of said gases through the catalyst bed are additive in a single direction, said compact bed of catalyst in passing downwardly through said plurality of combustion zones being subjected to successively increased gas pressures.

3. The method of catalyst regeneration which comprises continuously passing hot coke-containing catalyst from a catalytic hydrocarbon conversion operation downwardly to an enclosed regenerating region, reducing the temperature of catalyst entering the regenerating region in an initial cooling zone by indirect heat exchange, thereafter continuously passing the catalyst so reduced in temperature downwardly as a compact bed through uninterrupted treating zones hereinafter recited: first, through an upper combustion zone wherein the catalyst is contacted with oppositely flowing oxygen-containing gas to effect combustion of a portion of the coke content of the catalyst thereby increasing the temperature of said catalyst to above the temperature of said catalyst prior to said initial cooling but below desired maximum temperature of regeneration; then, through a direct heat exchange zone where cooling of the catalyst is effected by continuously passing through the compact bed of catalyst said oxygen-containing gas introduced under pressure from an external source at a temperature lower than that attained by said catalyst entering said zone; separating gaseous products from said upper combustion zone in an area above said initial cooling zone, discharging the separated gases from said area, continuously passing the partly regenerated catalyst as a compact bed from said upper combustion zone to a lower combustion zone, contacting the partly regenerated catalyst in said lower combustion zone with oppositely flowing regenerating gas to effect further combustion of coke in said catalyst thereby raising the temperature of the catalyst to desired maximum temperature, again reducing the catalyst temperature by passing the compact bed of catalyst through a cooling area, contacting the thus cooled catalyst in a lower gas inlet zone with fresh regenerating gas directly introduced into said zone at a pressure higher than that of the oxygen-containing gas as introduced into said direct heat exchange zone, and discharging the regenerated catalyst; the gases from said lower combustion zone being separated from the catalyst and discharged from the enclosed regenerating region above said last named cooling area and below said direct heat exchange zone, and said gases being discharged from said lower combustion zone at a pressure substantially equal to the inlet pressure of the oxygen-containing gas introduced into said direct heat exchange zone, whereby the direct admission of material quantities of gases from said lower combustion zone to said upper combustion zone is avoided.

JOHN W. BARKER.

REFERENCES CITED

The following references are of record in the file of this patent:

UNITED STATES PATENTS

| Number | Name | Date |
| --- | --- | --- |
| 1,784,536 | Pantenburg | Dec. 9, 1930 |
| 2,311,564 | Munday | Feb. 16, 1943 |
| 2,372,018 | Ruthruff | Mar. 20, 1945 |
| 2,409,596 | Simpson et al. | Oct. 15, 1946 |
| 2,416,214 | Payne | Feb. 18, 1947 |
| 2,418,673 | Sinclair et al. | Apr. 8, 1947 |
| 2,419,517 | Eastwood | Apr. 22, 1947 |
| 2,420,904 | Noll | May 20, 1947 |
| 2,423,813 | Lechthaler et al. | July 8, 1947 |
| 2,429,545 | Bergstrom | Oct. 21, 1947 |
| 2,436,780 | Simpson | Feb. 27, 1948 |
| 2,438,261 | Utterback | Mar. 23, 1948 |
| 2,441,170 | Rose et al. | May 11, 1948 |
| 2,499,304 | Evans | Feb. 28, 1950 |